US010721485B2

(12) United States Patent
Takeda

(10) Patent No.: US 10,721,485 B2
(45) Date of Patent: Jul. 21, 2020

(54) IMAGE CODING APPARATUS, IMAGE CODING METHOD, AND NON-TRANSITORY COMPUTER-READABLE STORAGE MEDIUM

(71) Applicant: CANON KABUSHIKI KAISHA, Tokyo (JP)

(72) Inventor: Eishi Takeda, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 206 days.

(21) Appl. No.: 15/785,899

(22) Filed: Oct. 17, 2017

(65) Prior Publication Data

US 2018/0109802 A1 Apr. 19, 2018

(30) Foreign Application Priority Data

Oct. 19, 2016 (JP) ................................. 2016-205467

(51) Int. Cl.
*H04N 19/426* (2014.01)
*H04N 19/172* (2014.01)
*H04N 19/109* (2014.01)
*H04N 19/105* (2014.01)
*H04N 19/15* (2014.01)
(Continued)

(52) U.S. Cl.
CPC ......... *H04N 19/426* (2014.11); *H04N 19/105* (2014.11); *H04N 19/109* (2014.11); *H04N 19/15* (2014.11); *H04N 19/172* (2014.11); *H04N 19/573* (2014.11); *H04N 19/176* (2014.11)

(58) Field of Classification Search
CPC .... H04N 19/105; H04N 19/15; H04N 19/573; H04N 19/426
See application file for complete search history.

(56) References Cited

U.S. PATENT DOCUMENTS

| | | | |
|---|---|---|---|
| 6,624,761 B2* | 9/2003 | Fallon | G06T 9/00 341/51 |
| 7,978,920 B2* | 7/2011 | Okazaki | H04N 19/51 375/240 |

(Continued)

FOREIGN PATENT DOCUMENTS

JP 2009-200627 A 9/2009

*Primary Examiner* — Christopher S Kelley
*Assistant Examiner* — Boubacar Abdou Tchoussou
(74) *Attorney, Agent, or Firm* — Carter, DeLuca & Farrell LLP

(57) ABSTRACT

An image coding apparatus comprising a coding unit generating coded data by executing prediction coding of an image of a coding target frame, a compression/decompression unit compressing a decoded image obtained by decoding the coded data and store it in a memory, and decompressing a compressed decoded image and output the decompressed decoded image as a reference image in the prediction coding, and a compression ratio calculation unit calculating a compression ratio of the compressed decoded image from the decoded image before compression and the compressed decoded image, wherein in accordance with the compression ratio of the compressed decoded image corresponding to a reference image used in inter-prediction coding processing among the stored compressed decoded images, execution of the bidirectional prediction using the reference image is controlled.

8 Claims, 5 Drawing Sheets

(51) Int. Cl.
*H04N 19/573* (2014.01)
*H04N 19/176* (2014.01)

(56) References Cited

U.S. PATENT DOCUMENTS

| | | | | |
|---|---|---|---|---|
| 8,194,736 | B2* | 6/2012 | Youn | H04N 19/176 |
| | | | | 370/451 |
| 8,488,892 | B2* | 7/2013 | Uematsu | H04N 19/105 |
| | | | | 382/238 |
| 9,641,838 | B2 | 5/2017 | Takeda | |
| 2007/0291131 | A1* | 12/2007 | Suzuki | H04N 19/105 |
| | | | | 348/222.1 |
| 2008/0089404 | A1* | 4/2008 | Okazaki | H04N 19/51 |
| | | | | 375/240 |
| 2008/0107349 | A1* | 5/2008 | Sung | H03M 7/46 |
| | | | | 382/245 |
| 2009/0257485 | A1* | 10/2009 | Youn | H04N 19/176 |
| | | | | 375/240.01 |
| 2012/0321208 | A1* | 12/2012 | Uematsu | H04N 19/105 |
| | | | | 382/238 |
| 2015/0181208 | A1* | 6/2015 | Park | H04N 19/00206 |
| | | | | 375/240.02 |

* cited by examiner

IMAGE CODING APPARATUS, IMAGE CODING METHOD, AND NON-TRANSITORY COMPUTER-READABLE STORAGE MEDIUM

BACKGROUND OF THE INVENTION

Field of the Invention

The present invention relates to an image coding apparatus, an image coding method, and a non-transitory computer-readable storage medium.

Description of the Related Art

In recent years, a technique of compressing an 8K-resolution image, an image in a color difference format of 4:2:2 or 4:4:4, and a multi-bit image in which the number of bits per pixel exceeds 8 bits using a hybrid video coding technique such as the HEVC (High Efficiency Video Codec) method or H.264 method has been studied. In this case, since the amount of data to be processed increases, memory access is a very big problem in an arrangement in which a hybrid image compression technique using inter-frame motion compensation and entropy coding such as HEVC or H.264 is implemented by hardware. In processing of the image compression hardware (to be referred to as a codec hereinafter), the load of processing of reading out a reference image from a memory in a rectangular pixel unit (macroblock) of 16 pixels×16 lines for inter-frame prediction is especially heavy, and memory access occurs the number of times which is about several times of an image size.

From the H.264 method, a bidirectional prediction method of reading out two reference images, generating an average image of the two images as a predicted image, and performing difference comparison with a current coded image is newly introduced to further improve the coding efficiency. If this method is adopted in the codec, the memory access amount further increases.

To solve this problem, Japanese Patent Laid-Open No. 2009-200627 proposes a method of imposing a coding restriction that, in a still image/moving image simultaneous recoding mode, reduces the number of reference frames, uses no bidirectional prediction/bidirectional prediction picture (B picture) as a coding picture type, and restricts coding to unidirectional prediction or intra-coding without using bidirectional prediction as a prediction mode for each macroblock.

In the method proposed in Japanese Patent Laid-Open No. 2009-200627, however, the effect of reducing the memory band of a codec is obtained at the expense of the coding efficiency. Therefore, the image quality deteriorates depending on a pattern.

SUMMARY OF THE INVENTION

The present invention provides a technique capable of preventing the coding efficiency from deteriorating while reducing the memory band in image coding.

One aspect of embodiments of inventions relates to an image coding apparatus comprising, a coding unit configured to generate coded data by executing prediction coding of an image of a coding target frame, a compression/decompression unit configured to compress a decoded image obtained by decoding the coded data and store the compressed decoded image in a memory, and decompress a compressed decoded image read out from the memory and output, to the coding unit, the decompressed decoded image as a reference image in the prediction coding, and a compression ratio calculation unit configured to calculate a compression ratio of the compressed decoded image from the decoded image before compression and the compressed decoded image, wherein in accordance with the compression ratio of the compressed decoded image corresponding to a reference image used by the coding unit in inter-prediction coding processing among compressed decoded images stored in the memory, execution of bidirectional prediction in the inter-prediction coding processing using the reference image by the coding unit is controlled.

Further features of the invention will become apparent from the following description of exemplary embodiments (with reference to the attached drawings).

DESCRIPTION OF THE EMBODIMENTS

An embodiment of the present invention will be described in detail below with reference to the accompanying drawings.

<System Arrangement>

Figure 1A:
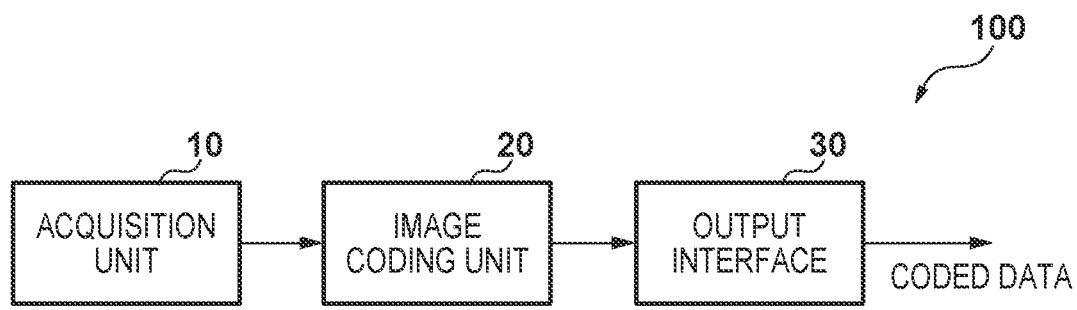
FIG. 1A is a block diagram showing an example of the arrangement of an image processing apparatus according to an embodiment of the present invention.
Figure 1B:
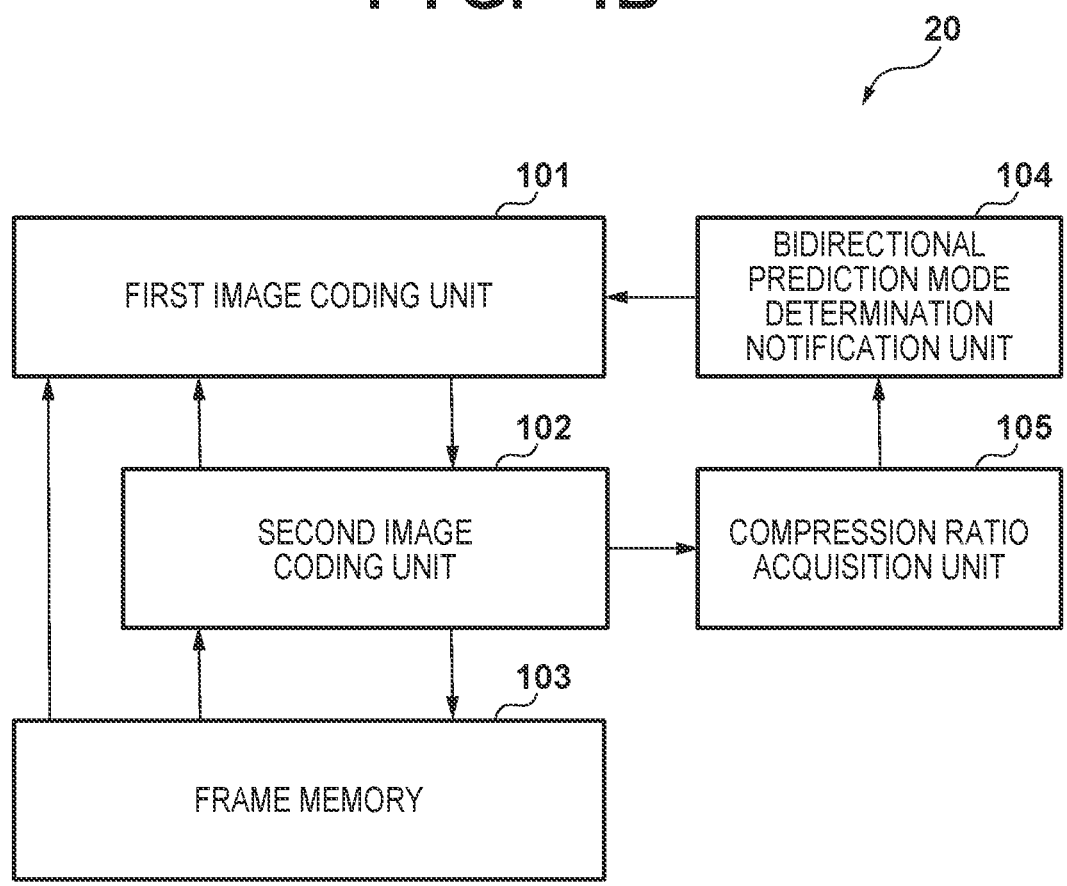
FIG. 1B is a block diagram showing an example of the arrangement of an image coding unit according to the embodiment of the present invention.

A system arrangement according to the embodiment of the present invention will be described with reference to FIGS. 1A and 1B. FIG. 1A is a block diagram showing an example of the arrangement of an image processing apparatus according to the embodiment of the present invention. An image processing apparatus 100 includes, for example, an acquisition unit 10, an image coding unit 20, and an output interface 30. Each block of the image processing apparatus 100 shown in FIG. 1A may be implemented by hardware using a dedicated device, a logic circuit, or a memory except for physical devices such as an image sensor and a display device. Alternatively, each block may be implemented by software by causing a computer such as a CPU to execute a processing program stored in a memory. Although the image processing apparatus 100 can be implemented as, for example, a digital camera, it can be implemented as an arbitrary information processing terminal or image capturing apparatus such as a personal computer, portable phone, smartphone, PDA, tablet terminal, or digital video camera.

Referring to FIG. 1A, the acquisition unit 10 has a function of inputting an image. The acquisition unit 10 includes, for example, an image capturing unit with an image sensor, and a component that externally inputs an image via a transmission path. Alternatively, the acquisition unit 10 includes a component that reads out an image from a recording medium or the like. The acquired image may be a still image or a moving image. If the image acquired by the acquisition unit 10 is a moving image, a moving image of a plurality of frames may be continuously acquired.

The acquisition unit 10 supplies the acquired image to the image coding unit 20. The image coding unit 20 codes the image supplied from the acquisition unit 10, and outputs coded data whose information amount is compressed. The output coded data is output via the output interface 30. The output interface 30 is connected to a storage medium having a memory capacity necessary to store the coded data output from the image coding unit 20, and can store the coded data in the storage medium. The storage medium may be a storage medium detachable from the image processing apparatus 100. Alternatively, the output interface 30 may be connected to a communication unit used by the image processing apparatus 100 to communicate with an external apparatus. In this case, the coded data is transmitted to the external apparatus via the communication unit.

Note that in FIG. 1A, the acquisition unit, the image coding unit 20, and the output interface 30 are shown as independent components. To implement these components in the image processing apparatus 100, these components may be integrated into one chip, or independently configured as separate components.

The arrangement of the image coding unit 20 according to the embodiment of the present invention will be described below with reference to FIG. 1B. FIG. 1B is a block diagram showing an example of the arrangement of the image coding unit 20 according to the embodiment of the present invention. The operations of the respective blocks of the image coding unit 20 according to this embodiment will be described below.

A first image coding unit 101 reads out, from a frame memory 103, an image of a coding target frame input from the acquisition unit 10, performs video compression for each frame (each picture) by inter-frame prediction and entropy coding based on the H.264 or HEVC method using the redundancy of the image, and outputs a coded bit stream.

A second image coding unit 102 operates as a compression/decompression unit for a local decoded image generated by the first image coding unit 101. More specifically, the second image coding unit 102 compresses the local decoded image after loop filter processing, which has been output in a coding processing by the first image coding unit 101, by lossless variable-length coding to which DPCM (Differential Pulse Code Modulation) is applied. The compressed local decoded image is stored in the frame memory 103 as a compressed reference image. If the first image coding unit 101 acquires a reference image for inter-prediction in the coding processing, a corresponding compressed reference image is read out from the frame memory 103, decompressed by variable-length decoding and inverse DPCM into the original local decoded image, and supplied to the first image coding unit 101 as a reference image.

The frame memory 103 stores each data such as an original image, reference image, or coded bit stream to be used by the first image coding unit 101 and the second image coding unit 102 in image processing. A bidirectional prediction mode determination notification unit 104 determines based on information from a compression ratio acquisition unit 105 whether a bidirectional prediction mode can be used or not, and notifies the first image coding unit 101 of a determination result. Based on data sizes before and after compression when the second image coding unit 102 performs lossless compression of the reference image, as described above, the compression ratio acquisition unit 105 calculates a compression ratio for each frame. The system arrangement of the image processing apparatus according to the embodiment of the present invention has been described. The coding processing in the first image coding unit 101 will be described next.

<Processing in First Image Coding Unit 101>

Figure 2:
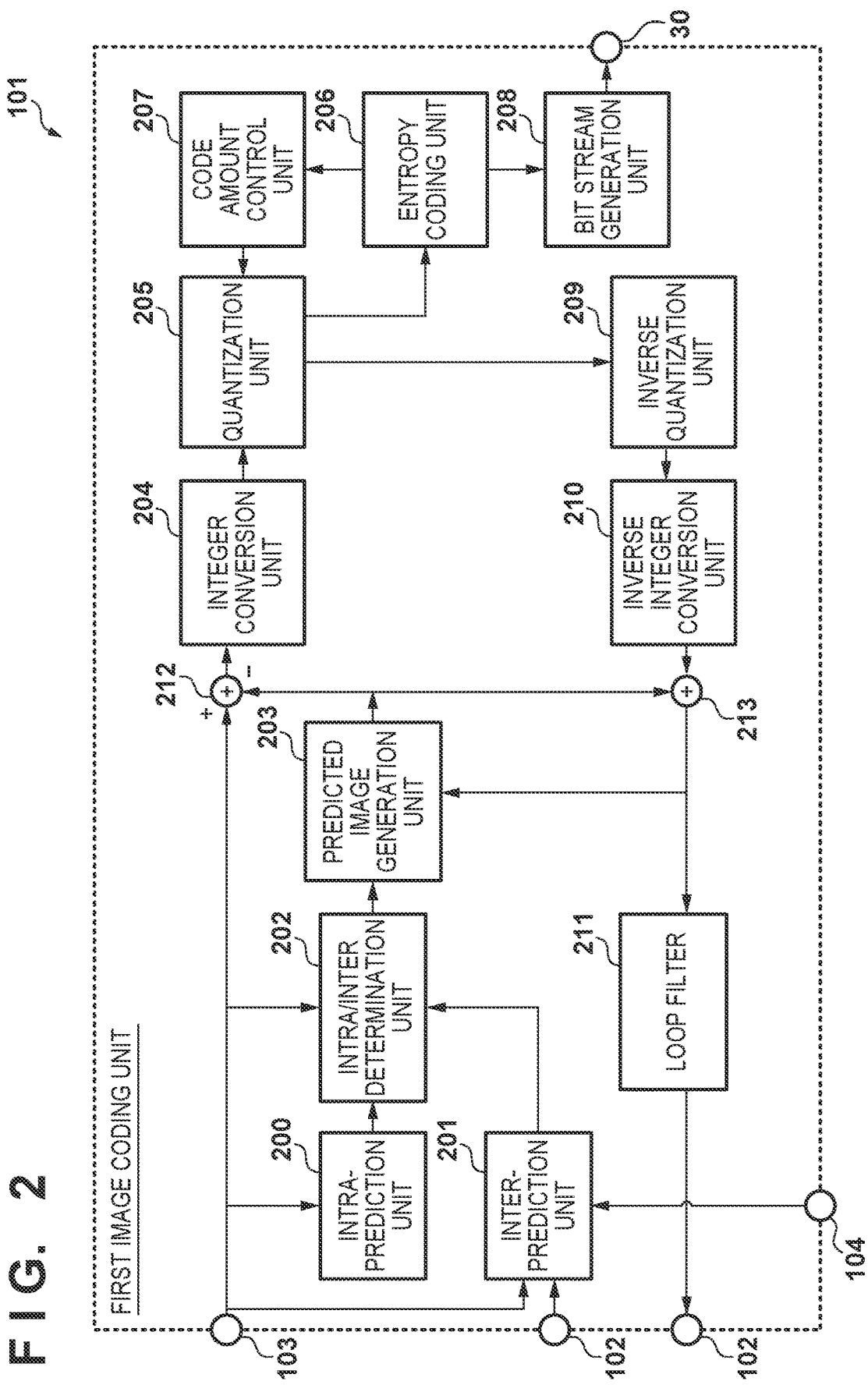
FIG. 2 is a block diagram showing an example of the arrangement of a first image coding unit according to the embodiment of the present invention.

FIG. 2 is a block diagram showing an example of the functional arrangement of the first image coding unit 101. As shown in FIG. 2, the first image coding unit 101 can include an intra-prediction unit 200, an inter-prediction unit 201, an intra/inter determination unit 202, a predicted image generation unit 203, an integer conversion unit 204, a quantization unit 205, an entropy coding unit 206, a code amount control unit 207, a bit stream generation unit 208, an inverse quantization unit 209, an inverse integer conversion unit 210, a loop filter 211, a subtracter 212, and an adder 213.

The intra-prediction unit 200 reads out an image of a coding target block from frame images stored in the frame memory 103, and calculates the correlations with a plurality of intra-predicted images generated from reference images around the coding target block. The intra-prediction unit 200 selects the intra-predicted image having the highest correlation, and notifies the intra/inter determination unit 202 of it.

Similarly, the inter-prediction unit 201 receives the image of the coding target block from the frame memory 103. The inter-prediction unit 201 also receives, from the second image coding unit 102, a reference image obtained by decoding, by the second image coding unit 102, a compressed reference image as a coded image stored in the frame memory 103. Pattern matching is performed on a block basis for the thus acquired coding target image and reference image, thereby calculating a motion vector. At this time, if, based on the information, indicating whether bidirectional prediction can be used, from the bidirectional prediction mode determination notification unit 104, it is determined that bidirectional prediction can be used, the inter-prediction unit 201 generates a predicted image from a plurality (for example, two) of reference images. The intra/inter determination unit 202 is notified of information of the motion vector having the highest correlation.

Based on the results of the outputs from the above-described intra-prediction unit 200 and the inter-prediction unit 201, the intra/inter determination unit 202 selects and determines a coding prediction method. As a practical selection method, with respect to the predicted image calculated by the intra-prediction unit 200 for the coding target block and the predicted image generated from the reference images using the motion vectors derived by the inter-prediction unit 201, prediction errors with the image of the coding target block are derived and compared. Alternatively, a method of obtaining prediction errors in the intra-prediction unit 200 or the inter-prediction unit 201, obtaining these prediction errors as evaluation values in the intra/inter determination unit 202, and comparing them with each other may be adopted. The intra/inter determination unit 202 determines, as a coding prediction mode, a prediction mode in which the difference value with respect to the predicted image is smaller, as a result of the comparison, and outputs the information to the predicted image generation unit 203.

The predicted image generation unit 203 generates a predicted image in accordance with the prediction mode selected by the intra/inter determination unit 202. The generated predicted image is output to the subtracter 212 of the preceding stage of the integer conversion unit 204, thereby generating a difference image with respect to the image of the coding target block. The predicted image is also output to the adder 213 of the succeeding stage of the inverse integer conversion unit 210, and added to the decoded difference image output from the inverse integer conversion unit 210, thereby generating a local decoded image as a decoded image.

The integer conversion unit 204 performs spatial resolution conversion for the difference image generated for the coding target block, thereby converting it into coefficient data in a spatial frequency domain. The quantization unit 205 performs quantization processing of quantizing, based on a target code amount, the coefficient data output from the integer conversion unit 204. The quantized coefficient data is output to the entropy coding unit 206 for performing entropy coding and to the inverse quantization unit 209 for generating a reference image and a predicted image.

The entropy coding unit 206 performs, for the coefficient data quantized by the quantization unit 205 or a vector value used in motion prediction in the case of inter-prediction, information compression by entropy coding using the deviation of the occurrence probability of bit data, such as a CABAC (Context-based Adaptive Binary Arithmetic Coding) method. The bit stream generation unit 208 adds parameters (header information such as SPS and PPS) necessary for decoding processing in addition to picture data corresponding to coded data of one screen from the entropy coding unit 206, forms the data in a predetermined data format, and outputs the data to the output interface 30 of the succeeding stage.

The code amount control unit 207 acquires the code amount of the coded data output from the entropy coding unit 206, calculates the target code amount per picture based on a bit rate or buffer model, and then performs feedback control for making a setting in the quantization unit 205. The inverse quantization unit 209 calculates coefficient data by multiplying again, by a quantization coefficient, the coefficient data quantized by the quantization unit 205. The inverse integer conversion unit 210 performs inverse integer conversion for the coefficient data output from the inverse quantization unit 209 to obtain a difference image, and outputs the difference image to the adder 213.

The adder 213 generates a local decoded image by adding the decoded difference image obtained by inverse integer conversion to the predicted image from the predicted image generation unit 203, thereby outputting the image to the loop filter 211. The loop filter 211 performs, for the local decoded image, filter processing (deblocking filter processing) of reducing coding deformation which occurs at a block boundary, and outputs the processed image to the second image coding unit 102.

<Processing in Second Image Coding Unit 102>

Figure 3:
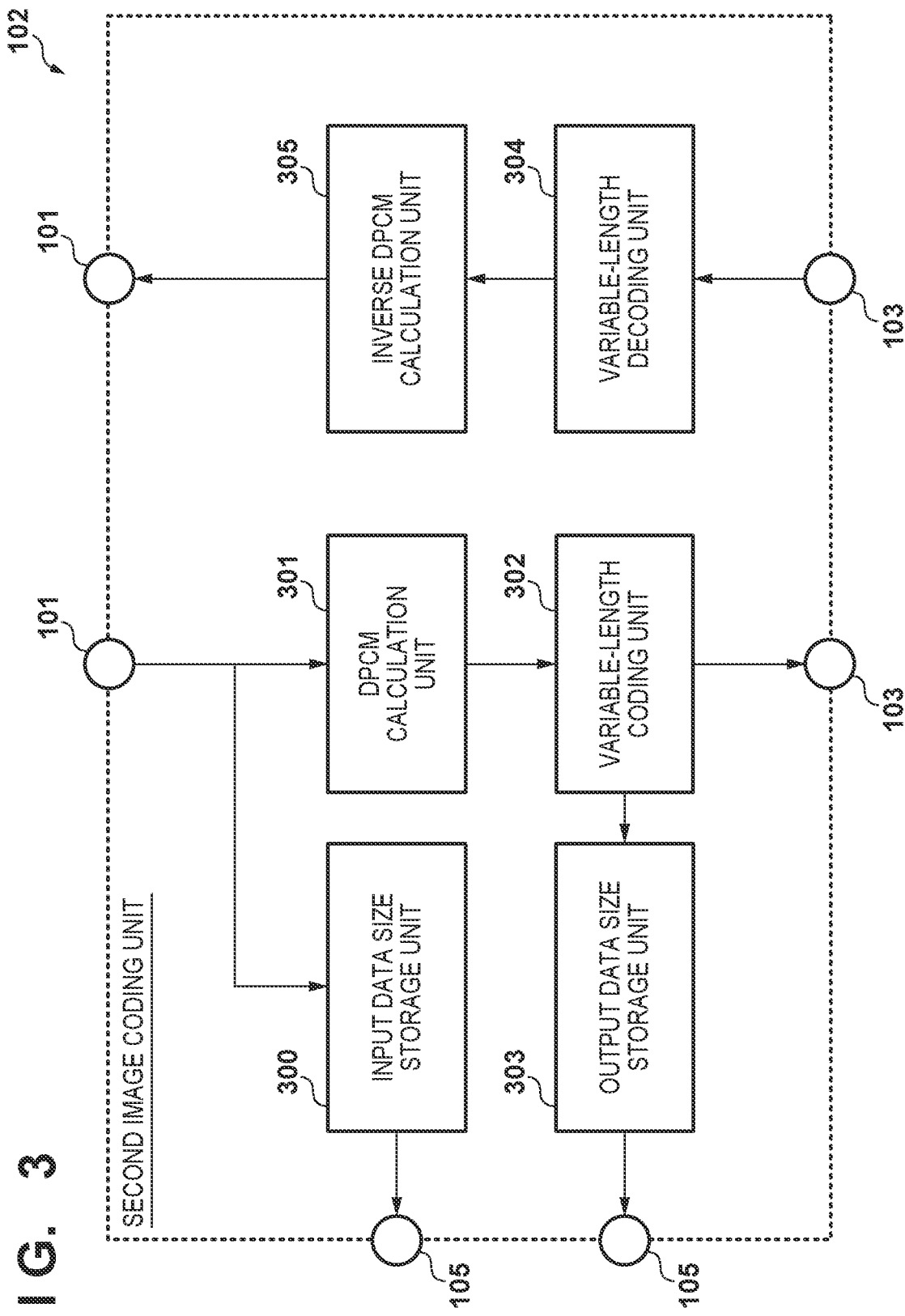
FIG. 3 is a block diagram showing an example of the arrangement of a second image coding unit according to the embodiment of the present invention.

The processing in the second image coding unit 102 will be described next. FIG. 3 is a block diagram showing an example of the functional arrangement of the second image coding unit 102. As shown in FIG. 3, the second image coding unit 102 can include an input data size storage unit 300, a DPCM calculation unit 301, a variable-length coding unit 302, an output data size storage unit 303, a variable-length decoding unit 304, and an inverse DPCM calculation unit 305.

The input data size storage unit 300 receives the local decoded image output from the loop filter 211 of the first image coding unit 101, and stores the data size of the image for each frame. The input data size storage unit 300 outputs information of the data size for each frame to the compression ratio acquisition unit 105. Note that the data size of the local decoded image can be uniquely derived as long as the screen size of a coding target picture, a color difference format, and a bit depth per pixel are known. Therefore, unlike this embodiment, it is unnecessary to add and accumulate the data size for each macroblock, and the present invention does not particularly limit the method as long as it is possible to acquire synonymous information.

The DPCM calculation unit 301 is configured to include a delay circuit and a subtracter for one pixel. Upon receiving the local decoded image output from the loop filter 211 of the first image coding unit 101, the DPCM calculation unit 301 calculates, for each pixel, the difference value between adjacent pixels using, as predicted values, the pixel values of adjacent pixel data, and outputs the calculated value to the variable-length coding unit 302 of the succeeding stage. The variable-length coding unit 302 performs coding by a predetermined variable-length coding method for the difference value between the adjacent pixels acquired from the DPCM calculation unit 301, and stores the coded data in the frame memory 103 in a unit of a predetermined number of pixels. Although the predetermined variable-length coding method includes Huffman coding, Golomb coding, and Wyle coding, the present invention is not limited to them. The variable-length coding unit 302 compresses the data by a method of assigning a shortest code length when the input value is 0 (that is, the pixel values of adjacent pixels are equal to each other) and assigning a longer code length as the absolute value of the input value is larger. The output data size storage unit 303 stores a data size obtained by adding one frame size to the data size of the coded data corresponding to the compressed decoded image generated by the variable-length coding unit 302, and outputs the data size to the compression ratio acquisition unit 105.

In this embodiment, since the correlation between adjacent pixels in a natural image is generally high, the characteristic in which the distribution of the difference value between the adjacent pixels is a Gaussian distribution with a peak around zero is used. By applying variable-length coding which assigns a short code to a portion where the difference value is small, the second image coding unit 102 can reduce the amount of data to be accessed in the memory.

In accordance with the timing of a reference image acquisition request in the inter-frame prediction processing in the first image coding unit 101, the variable-length decoding unit 304 reads out the coded data corresponding to the coding target block from the frame memory 103, and reconstructs the original difference value by performing variable-length decoding processing. The reconstructed difference value is output to the inverse DPCM calculation unit 305. The inverse DPCM calculation unit 305 is configured to include a delay circuit and an adder for one pixel. The difference values received from the variable-length decoding unit 304 are added to the decoded pixel values, thereby calculating the pixel values of the original decoded image. The local decoded image reconstructed by the decompression processing is output to the first image coding unit 101 as a reference image.

<Processing Procedure>

Figure 4:
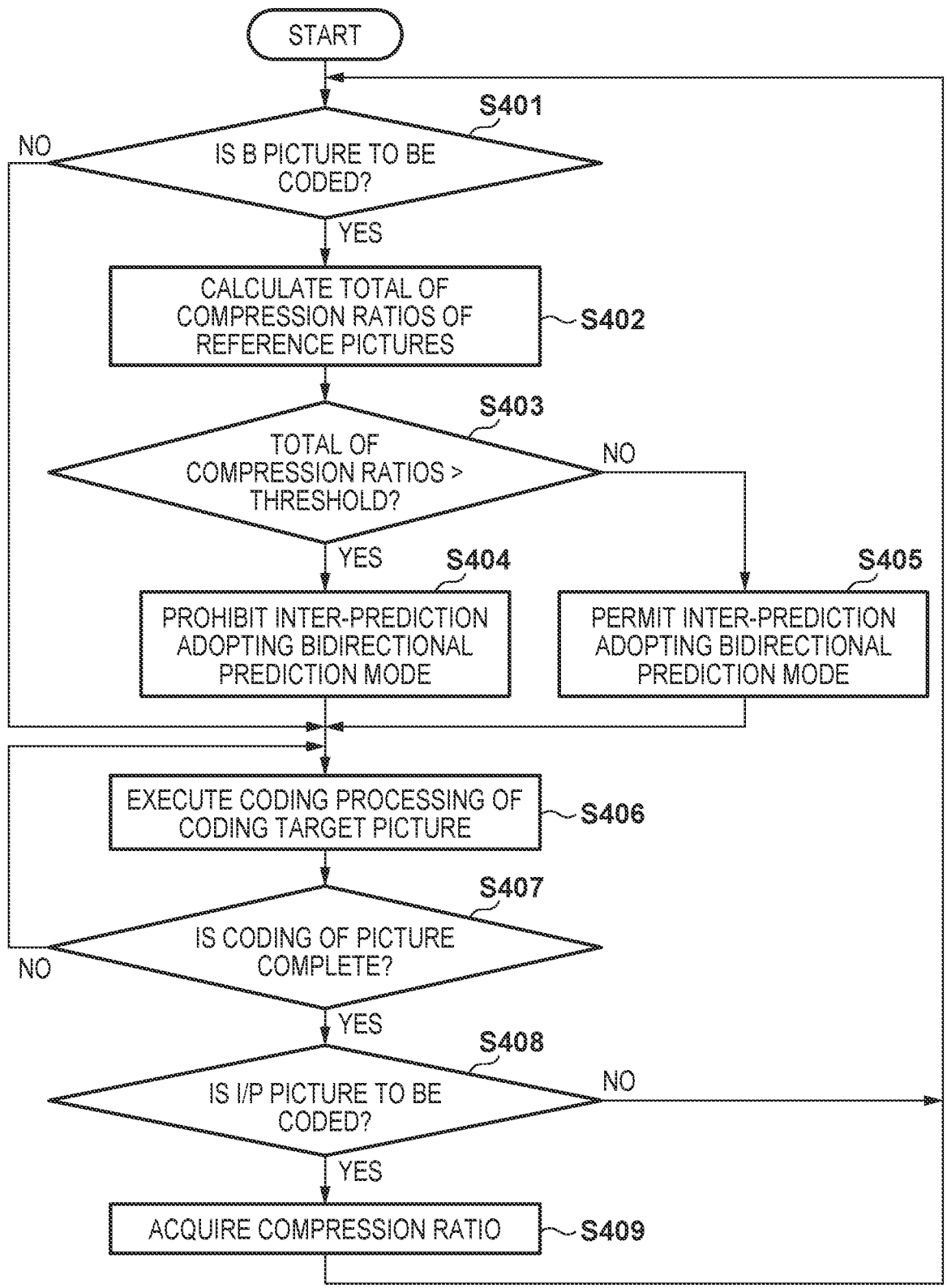
FIG. 4 is a flowchart illustrating an example of coding processing according to the embodiment of the present invention.

The procedure of the coding processing in the system arrangement according to the embodiment of the present invention will be described with reference to a flowchart shown in FIG. 4.

This processing procedure is executed for every 1-frame period when, for example, the image processing apparatus 100 is set in a moving image recording state in response to a trigger such as a user operation.

In step S401, the first image coding unit 101 determines whether the picture type of the coding target frame (coding target picture) is a B picture to which inter-frame prediction using a plurality of reference images is applicable. If the coding target picture is a B picture (YES in step S401), the process shifts to step S402; otherwise (NO in step S401), the process shifts to step S406. If the coding target picture is a B picture, the coded picture to be referred to is an I or P picture. In step S402, the compression ratio acquisition unit 105 calculates the total of the compression ratios of the pictures when the second image coding unit 102 codes the I and B pictures, and notifies the bidirectional prediction mode determination notification unit 104 of a calculation result.

In step S403, the bidirectional prediction mode determination notification unit 104 determines whether the total of the compression ratios of the reference images calculated by the compression ratio acquisition unit 105 is larger than a predetermined threshold. This determination processing makes it possible to verify whether the memory band can be ensured when reading out the plurality of pictures as reference images from the frame memory 103. In this embodiment, for the sake of descriptive simplicity, assume that the number of reference images of the B picture is two and the threshold of the total of the compression ratios is 100%.

However, the embodiment of the present invention is not limited to this. For example, in the H.264 method, two reference pictures can be selected for each coding target block, and three or more (up to 16) reference images can be used for the same B picture. Even if three or more reference images are used, it is possible to apply this embodiment to be described below by using the total value of compression ratios and a threshold corresponding to the number of images to be used. The threshold value can be set based on, for example, a data transfer rate to the frame memory, instead of the number of reference images.

As an example, consider a case in which inter-prediction coding processing by bidirectional prediction is performed for the processing target block in the first image coding unit 101 with reference to the first and second reference images. In this case, assuming that in the second image coding unit 102, the local decoded image of the first reference image is compressed to 40% and the local decoded image of the second reference image can be compressed to 60%, the total is 100%. At this time, the two reference images are compressed to one image size, and stored in the frame memory 103, and correspond to a data amount when reading out an uncompressed reference image of one frame from the memory. Therefore, even if two reference images are used, an access amount to the frame memory 103 can be reduced to an amount corresponding to one image.

If it is determined in step S403 that the total of the compression ratios is larger than the threshold (YES in step S403), the process advances to step S404. In this case, if bidirectional prediction is used in inter-prediction coding processing, data access which exceeds one frame may occur. Thus, it is determined to suppress the use of the bidirectional prediction mode for the B picture, and the first image coding unit 101 is notified of it. On the other hand, if the total of the compression ratios is equal to or smaller than the threshold (NO in step S403), the process advances to step S405. In this case, since data of one frame or less is accessed in the memory band, the bidirectional prediction mode determination notification unit 104 determines that the inter-prediction coding processing adopting the bidirectional prediction mode may be performed for the coded picture, and notifies the first image coding unit 101 of it.

In this embodiment, only coding restriction for suppressing the use of the bidirectional prediction mode when the total of the compression ratios exceeds the threshold is set. However, a method of reducing the memory band by fixing the number of reference images to one and restricting the mode to the unidirectional prediction mode is also applicable. In this case, as a method of restricting the mode to the unidirectional prediction mode, a picture close (temporally close) to the coding target picture in temporal distance can be selected as a reference image from the viewpoint of the coding efficiency.

In step S406, the first image coding unit 101 executes the coding processing of the coding target picture based on the above-described settings of the coding parameters. The coding processing is executed when the first image coding unit 101, the second image coding unit 102, and the frame memory 103 operate, as described above. In step S407, for example, the first image coding unit 101 determines whether the coding processing of the coding target picture is complete. This determination processing may be performed by a method of repeatedly inquiring about the operation states by polling or by an interrupt notification by microcomputer control using the CPU or the like.

If it is determined that the coding processing for each frame is complete (YES in step S407), the process advances to step S408. In step S408, for example, the first image coding unit 101 determines whether the picture type of the coding picture is an I or P picture which can be used as a reference image. If it is determined that the coding picture is an I or P picture (YES in step S408), the process advances to step S409. In step S409, the compression ratio acquisition unit 105 acquires information of each data size from the input data size storage unit 300 and output data size storage unit 303 of the second image coding unit 102, calculates the compression ratio of the coding target picture, and stores it. After that, the process returns to step S401, and repeats the above-described coding processing for the next coding target picture. On the other hand, if the coding target picture is a B picture, the coding processing of the next frame is continued.

In the above-described embodiment, the picture to be used as a reference image when the coding target picture is a B picture is an I or P picture. However, a B picture can be used as a reference image in accordance with the standard. A B picture which can be used as a reference image can be processed in the same manner as for the I or P picture to acquire a compression ratio, and whether to execute bidirectional prediction can be controlled in accordance with the compression ratio.

<Operation Timing>

Figure 5:
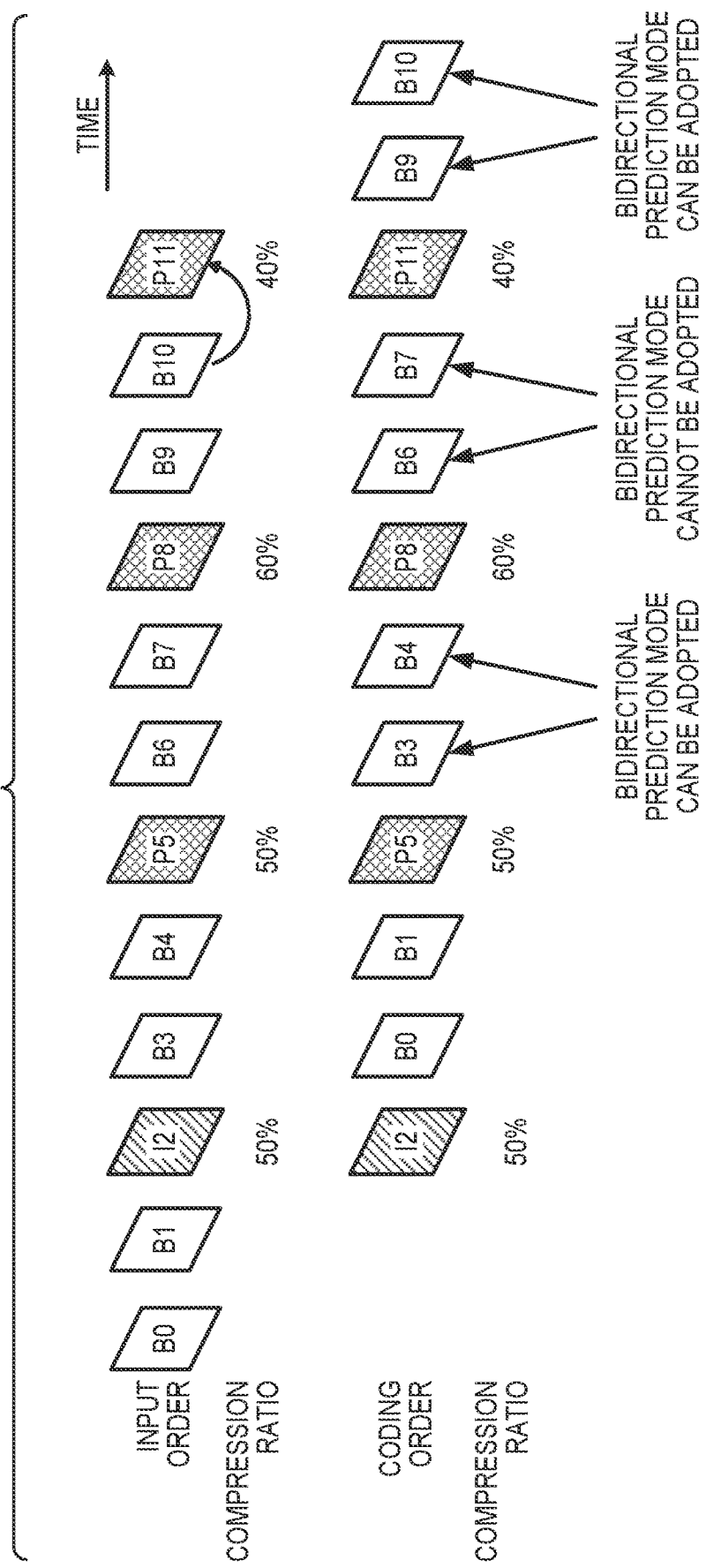
FIG. 5 is a view for explaining a prediction mode switching operation according to the embodiment of the present invention.

With respect to the coding processing according to this embodiment, an operation timing in the time direction and an application example will be described with reference to FIG. 5. FIG. 5 shows the input order and coding order of respective frames when 12 frames are coded. For each frame, the picture type of I, P, or B is indicated. For each of the I and P pictures serving as reference images, the compression ratio of the local decoded image is exemplified.

FIG. 5 shows a bidirectional case in which preceding and succeeding I and P pictures are referred to in the display order with respect to a B picture. However, the embodiment of the present invention can be applied to a case in which only a preceding picture or only a succeeding picture is referred to, as a matter of course. Alternatively, another B picture can be referred to, and three or more reference images may be used.

In the coding processing according to the embodiment of the present invention, if each of a B3 picture and a B4 picture in FIG. 5 undergoes bidirectional prediction coding, pictures to be referred to by this picture can be a preceding I2 picture and a succeeding P5 picture in the time direction. The I2 and P5 pictures precede the B3 and B4 pictures in the coding order, and the coded I2 and P5 pictures have 50% as the compression ratio of the local decoded image. In this embodiment, the information of the compression ratio can be acquired at the start of coding of each of the B3 and B4 pictures, and the bidirectional prediction mode determination notification unit 104 can determine whether the total of the compression ratios is larger than the threshold. In this case, since the total of the compression ratios is 100%, and is equal to or smaller than the predetermined value, the bidirectional prediction mode can be adopted in the inter-prediction coding processing of the B3 and B4 pictures. In this case, even if the bidirectional prediction mode is adopted, the memory band never runs out and two reference images can be used. Thus, it is possible to improve the coding efficiency.

On the other hand, with reference to B6 and B7 pictures, the total of the compression ratios of P5 and P8 pictures as reference pictures is 110%, and is larger than the predetermined value. Therefore, the B6 and B7 pictures are coded by suppressing the use of the bidirectional prediction mode, thereby prioritizing ensuring of the memory band. At this time, coding may be performed by referring to only one of the P5 and P8 pictures. For example, for the B6 picture, the P5 picture which is close in time distance can be selected. For the B7 picture, the P8 picture which is close in time distance can be selected. Furthermore, with respect to B9 and B10 pictures, it is possible to perform coding by permitting the bidirectional prediction mode to be adopted in the above-described manner.

As described above, in this embodiment, a reference image which increases memory access in image coding processing undergoes lossless compression, and is then stored in the frame memory. This can reduce the size of the reference image stored in the frame memory, thereby reducing the memory access amount. Furthermore, since it is possible to apply coding which dynamically uses the bidirectional prediction mode based on the compression ratio, the coding efficiency can also be improved.

Other Embodiments

Embodiments of the invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-205467, filed Oct. 19, 2016, which is hereby incorporated by reference herein in its entirety.

What is claimed is:

1. An image coding apparatus comprising:
one or more processors;
a memory; and
a program stored in the memory which, when executed by the one or more processors, caused the one or more processors to perform as:
 a coding/decoding unit configured to generate coded data by executing prediction coding of an image of a coding target frame and to generate a decoded image by decoding the coded data;
 a compression/decompression unit configured to compress the decoded image obtained from the coding unit and store the compressed decoded image in a frame memory, to decompress the compressed decoded image read out from the frame memory and to output, to the coding unit, the decompressed decoded image as a reference image in the prediction coding; and
 a compression ratio calculation unit configured to calculate a compression ratio of the compressed decoded image from the decoded image before compression and the compressed decoded image,
wherein when the coding unit generates the coded data for the image of the coding target frame having a picture type of B picture by executing prediction coding, the coding unit determines whether to execute bidirectional prediction in the inter-prediction coding processing using the reference image in accordance with a total of compression ratios of a plurality of compressed decoded images to be used as the reference images among compressed decoded images compressed by the compression/decompression unit and stored in the frame memory, and
wherein if the total of compression ratios of the plurality of compressed decoded images exceeds a threshold, the coding/decoding unit suppresses execution of bidirectional prediction in inter-prediction coding processing using the plurality of reference images.

2. The image coding apparatus according to claim 1 wherein if the total of the compression ratios of the compressed decoded images is not larger than the threshold, the coding unit executes bidirectional prediction in the inter-prediction coding processing using the plurality of reference images.

3. The image coding apparatus according to claim 1, wherein if the total of compression ratios of the plurality of compressed decoded images exceeds the threshold, the coding unit executes inter-prediction coding processing using, among the plurality of reference images, a reference image temporally closer to the coding target frame than another reference image among the plurality of reference images.

4. The image coding apparatus according to claim 1, wherein the compression ratio calculation unit calculates the compression ratio with respect to a coding target frame whose picture type is one of an I picture and a P picture.

5. The image coding apparatus according to claim 1, wherein the compression/decompression unit compresses the decoded image by coding a difference value between adjacent pixels of the decoded image in accordance with a variable-length coding method.

6. An image coding method comprising:
generating coded data by executing prediction coding of an image of a coding target frame;
generating a decoded image by decoding the coded data;
compressing the decoded image and storing the compressed decoded image in a frame memory, decompressing the compressed decoded image read out from the frame memory and supplying the decompressed decoded image as a reference image in the prediction coding for generating the coded data; and
calculating a compression ratio of the compressed decoded image from the decoded image before compression and the compressed decoded image,
wherein in the generating of the coded data for the image of the coding target frame having a picture type of B picture by executing prediction coding, it is determined whether to execute bidirectional prediction in the inter-prediction coding processing using the reference image in accordance with a total of compression ratios of a plurality of compressed decoded image to be used as the reference images among compressed decoded images stored in the frame memory, and
wherein if the total of compression ratios of the plurality of compressed decoded images exceeds a threshold, execution of bidirectional prediction in inter-prediction coding processing using the plurality of reference images is suppressed in the generating of the coded data.

7. A non-transitory computer-readable storage medium storing a program that, when executed by a processor of an image coding apparatus, causes the processor to perform operations comprising:
generating coded data by executing prediction coding of an image of a coding target frame;
generating a decoded image by decoding the coded data;
compressing the decoded image and storing the compressed decoded image in a frame memory, decompressing the compressed decoded image read out from the frame memory and supplying the decompressed decoded image as a reference image in the prediction coding for generating the coded data; and
calculating a compression ratio of the compressed decoded image from the decoded image before compression and the compressed decoded image,
wherein in the generating of the coded data for the image of the coding target frame having a picture type of B picture by executing prediction coding, it is determined whether to execute bidirectional prediction in the inter-prediction coding processing using the reference image in accordance with a total of compression ratios of a plurality of compressed decoded images to be used as the reference images among compressed decoded images stored in the frame memory, and
wherein if the total of compression ratios of the plurality of compressed decoded images exceeds a threshold, execution of bidirectional prediction in inter-prediction coding processing using the plurality of reference images is suppressed in the generating of the coded data.

8. The apparatus according to claim 1, wherein the threshold corresponds to a number of the plurality of compressed decoded images to be used as the reference images.

* * * * *